US008900412B2

(12) United States Patent  (10) Patent No.: US 8,900,412 B2
Borkar et al.  (45) Date of Patent: Dec. 2, 2014

(54) SURFACE APPLICATION OF POLYMERS TO IMPROVE PAPER STRENGTH

(75) Inventors: Sachin Borkar, Wilmington, DE (US); Marc C. Putnam, Newark, DE (US)

(73) Assignee: Solenis Technologies Cayman, L.P. (CH)

( * ) Notice: Subject to any disclaimer, the term of this patent is extended or adjusted under 35 U.S.C. 154(b) by 0 days.

(21) Appl. No.: 13/285,382

(22) Filed: Oct. 31, 2011

(65) Prior Publication Data

US 2012/0111517 A1  May 10, 2012

Related U.S. Application Data

(60) Provisional application No. 61/410,483, filed on Nov. 5, 2010.

(51) Int. Cl.
| | |
|---|---|
| *D21H 19/20* | (2006.01) |
| *C09D 103/00* | (2006.01) |
| *C09D 133/24* | (2006.01) |
| *C09D 133/08* | (2006.01) |
| *C09D 133/10* | (2006.01) |
| *C09D 7/12* | (2006.01) |
| *C09D 133/26* | (2006.01) |
| *C08L 33/26* | (2006.01) |
| *C08F 220/54* | (2006.01) |
| *C08F 220/56* | (2006.01) |

(52) U.S. Cl.
CPC ............ *C09D 103/00* (2013.01); *C09D 133/26* (2013.01); *C08L 33/26* (2013.01); *C08F 220/54* (2013.01); *C08F 220/56* (2013.01)
USPC ............. 162/135; 524/47; 524/555; 524/556; 524/560; 524/565; 524/805; 524/812

(58) Field of Classification Search
USPC ........... 524/47, 555, 556, 560, 565, 805, 812; 162/135
See application file for complete search history.

(56) References Cited

U.S. PATENT DOCUMENTS

| | | | | |
|---|---|---|---|---|
| 3,542,707 A | * | 11/1970 | Wilkinson ....................... 524/47 |
| 3,597,374 A | * | 8/1971 | Nagan .............................. 524/48 |
| 4,191,610 A | | 3/1980 | Prior | |
| 4,421,602 A | | 12/1983 | Brunnmueller et al. | |
| 5,242,545 A | | 9/1993 | Bradway et al. | |
| 5,281,037 A | | 1/1994 | Asada et al. | |
| 2,721,140 A | | 10/1995 | Weisgerber | |
| 5,698,627 A | | 12/1997 | Oguni et al. | |
| 5,961,782 A | | 10/1999 | Luu et al. | |
| 6,159,340 A | | 12/2000 | Niessner et al. | |
| 6,294,645 B1 | | 9/2001 | Allen et al. | |
| 6,303,000 B1 | | 10/2001 | Floyd et al. | |
| 6,335,085 B1 | * | 1/2002 | Asano et al. ................ 428/32.25 |
| 6,482,883 B1 | * | 11/2002 | Cuch et al. ..................... 524/492 |
| 6,616,807 B1 | | 9/2003 | Dyllick-Brenzinger et al. | |
| 6,710,175 B2 | * | 3/2004 | Anderson et al. ............... 536/45 |
| 6,797,785 B1 | | 9/2004 | Hund et al. | |
| 6,939,443 B2 | | 9/2005 | Ryan et al. | |
| 6,979,481 B2 | * | 12/2005 | Gaynor et al. ............. 428/32.27 |
| 7,547,376 B2 | * | 6/2009 | Satoh ......................... 162/168.3 |
| 7,732,525 B2 | * | 6/2010 | Branston et al. ............. 524/501 |
| 7,988,826 B2 | * | 8/2011 | Inaoka et al. ................. 162/135 |
| 2005/0022956 A1 | * | 2/2005 | Rodriguez et al. ............ 162/135 |
| 2005/0161182 A1 | | 7/2005 | Capwell | |
| 2005/0287385 A1 | | 12/2005 | Quick | |
| 2006/0276370 A1 | * | 12/2006 | Zhang et al. ................... 510/470 |
| 2011/0112224 A1 | * | 5/2011 | Borkar et al. ................... 524/47 |

FOREIGN PATENT DOCUMENTS

| | | | |
|---|---|---|---|
| JP | 49013406 A | * | 2/1974 |
| JP | 11323774 A | * | 11/1999 |
| WO | 2004027149 | | 1/2004 |
| WO | 2006027632 | | 3/2006 |
| WO | 2011057044 | | 5/2011 |

OTHER PUBLICATIONS

JP 49013406 A, Feb. 1974, Derwent Ab.*
JP 11323774 A, Nov. 1999, Machine translation.*
Hiroo Tanaka and Lars Odberg, Preparation of Cationic Polyacrylamides by a Modified Hofmann Reaction: Fluorescent Labeling of Cationic Polyacrylamides, Journal of Polymer Science: Part A: Polymer Chemistry, vol. 27, 4329-4339 (1989).
International Search Report, PCT/US2011/058620, pp. 2, dated Mar. 8, 2012.

* cited by examiner

*Primary Examiner* — Satya Sastri

(74) *Attorney, Agent, or Firm* — Joanne Rossi; Michael Herman

(57) ABSTRACT

Stable, coating compositions are disclosed. The compositions comprise an aqueous solution of cationic polymer, starch, and a stabilizing agent. Method of using the coating composition to improve the dry strength of paper is also disclosed.

21 Claims, No Drawings

SURFACE APPLICATION OF POLYMERS TO IMPROVE PAPER STRENGTH

This application claims the benefit of U.S. provisional application No. 61/410,483, filed Nov. 5, 2010, the entire contents of which are hereby incorporated by reference.

FIELD OF THE INVENTION

This invention relates to surface applied strength additives for paper and a method for preparing these additives. Particularly, this invention relates to surface strength additives comprising acrylamide polymers or its copolymers with cationic vinyl monomers or cationic allyl monomers or vinylformamide or their hydrolyzed product. Along with surface applied starch, these additives provide paper with excellent bursting strength, compression strength, and other such properties.

BACKGROUND ART

Economics and environmental necessity is driving the paper industry to increase their use of recycled fibers. Among the advantages of using recycled paper are cost savings, less refinement, easy availability, and environmental sustainability. However, increasing the number of passes through the recycling process makes the recycled fibers progressively shorter and more rigid resulting in decreases in pulp strength and also fiber-fiber bonding strength. Strength is an integral parameter for packaging grade paper. One way to recover the strength lost during the recycling process is through further refinement, but in case of recycled fibers the refining process has very limited window. Another approach is the utilization of strength chemicals during the paper making process. However, interference with recycled additives, uniform formation of paper, drainage, and productivity are the major factors that need to be taken into account.

Additives are added to the pulp slurry prior to sheet formation to improve machine runnability, productivity, and paper properties. These include wet and dry strength additives (e.g. cationic and anionic polyacrylamides, functionalized polyamides with epihalohydrin, polyvinylamines), retention and drainage aids (e.g. alum, polyethylene imines), defoamers, fillers that control pitch and stickies. Various sizing agents, alkyl ketene dimer (AKD) and alkyl succinic anhydride (ASA) that impart hydrophobic properties are also added.

Common wet end additives for enhancing dry strength of the finished sheet are starch or guar gum. The modification of starch to improve its performance has been well documented. The choice and type of the starch for strength application varies from region to region and is dependent on its cost and availability (see "Starch and Starch Products in Paper Coating," R. L. Kearney and H. W. Maurer, Ed. 1990).

Cross-linking starch to improve its strength enhancing properties has been employed. For example, Huang et al. describe the use of boron containing compounds to crosslink starch during the paper making process, resulting in improved physical and mechanical properties (WO 2004/027,149 A1). The cross-linked starch composition comprises reaction product formed by reacting starch slurry with boric acid or zinc borate during the gelatinization process.

U.S. Pat. No. 6,303,000 granted to Floyd et al., discloses gelatinized starch compositions cross-linked with a glyoxal resin and the use of same in papermaking. During the starch gelatinization process, starch is reacted with blocked glyoxal which results in starch cross-linking and this mixture is added to the pulp slurry before sheet formation. The limitation of these particular starch cross-linking compounds is that compression resistance can be improved, whereas resistance to puncture tends to suffer.

Strength additives that are added at the wet end to improve paper strength, especially in paper made from recycled fibers, include amphoteric acrylamide based polymers and coacervate technology. An example of the former is described in U.S. Pat. No. 5,698,627, issued to Oguni, which teaches the synthesis of acrylamide based amphoteric copolymers that improve freeness, retention, and dry strength of recycled corrugated base paper. An example of coacervate technology is described in U.S. Pat. No. 6,294,645. This wet end dry strength system is comprised of a low charge polyamidoamine-epichlorohydrin and an anionic polyacrylamide, added sequentially to a pulp slurry.

Polyvinylamine has been utilized as a dry and wet strength additive, and a retention and drainage aid in the papermaking process. Due to high density of amine functionality, this polymer possesses higher charge density and ultimately has enhanced hydrogen bonding between cellulose fiber and the polymer chain. Weisgerber et al. in U.S. Pat. No. 2,721,140 disclose the use of polyvinylamine, prepared by the hydrolysis of polyvinyl N-phthalimide, as a wet strength additive for paper making. Tanaka and Ödberg, in J. Polym. Sci. Part A: Polymer Chemistry 1989, (27) 4329-4339, describes a method of preparing polyvinylamine via a Hoffman reaction of polyacrylamide. U.S. Pat. No. 5,961,782 issued to Luu et al., discloses use of polyvinylamine to make crosslinkable creping adhesive formulations. Niessner et al, in U.S. Pat. No. 6,159,340, discloses the use of polyvinylamine as dry and wet strength additives in paper and paperboard production. U.S. Pat. Nos. 4,421,602, 6,616,807 and 6,797,785 disclose use of polyvinylamines as drainage aids, flocculants, and retention aids in the paper making.

Interference with excess anionic trash coming via recycling process coupled with poor fiber quality demands significantly increased additive levels. In addition to high cost, wet end additives reach a plateau performance, that is, further chemical does not provide increased performance. Practitioners of paper making have overcome these limitations by applying additives after paper formation. Employed techniques include metered size press, puddle size press, spray, roll coater, blade coater, and air knife coater. Coating or surface sizing additives commonly employed are polyacrylic emulsions, poly(styrene-co-butadiene) emulsions with various particles sizes, poly(vinylacetate), and polyvinyl alcohol. Because these additives have good film forming properties, they typically are used to impart a certain amount of resistance to various liquids.

The most commonly applied surface additive is starch. Excess use of starch may have negative impacts on other paper properties, like fold cracking, and also productivity, for example higher energy drying. Since size press application of starch is an on-machine operation, any problem which interferes with operation of the size press has the potential to interfere with operation of the entire paper machine.

The amount of starch that can be applied during size press treatment of a paper sheet (i.e., the wet pick up of the sheet) is dependent on the size press conditions, the viscosity of the starch solution and the penetration of starch solution into the paper sheet (U.S. Pat. No. 4,191,610 issued to Prior). Modification of size press starch usually introduces functionality to the starch molecule, and can decrease its viscosity. The maximum amount of modified starch that can be economically and practically applied during size press treatment is about 10 $g/m^2$ and for unmodified or native or high viscosity starch the maximum is 5 $g/m^2$. U.S. Pat. No. 5,242,545 discloses running the size press treatment at higher temperature and increasing size press nip pressure, the starch loading can be increased to 17-20 g/m². Further, WO 2006/027,632 A2 teaches that lignosulfonate, contained in the black liquor waste stream of a typical pulping process, can be mixed with starch to lower the size press solution viscosity and allows application of a higher solids content on paper during size press treatment, helping to conserve energy during sheet drying process.

U.S. Pat. No. 5,281,307 issued to Smigo, discloses the use of vinylalcohol and vinylamine copolymer crosslinked using glyoxal for dry end application. The submerging of Whatman filter paper in polymer solution and subsequent drying shows improvement in paper properties.

Of the aforementioned wet end strength additives many have found utility at the dry end. Whereas the components of a wet end strength system are added sequentially to a slurry of pulp, which moderates potential incompatibilities between components, each component of a surface applied strength additive system needs to be combined into a single, stable solution. As starch is almost always a component of a dry strength system, other components need to exhibit solution stability when combined with starch, i.e. no precipitation, no gel formation, or severe viscosity increases. Glyoxal releasing chemicals and glyoxal containing polymers would be expected to be compatible as their cross linking activation typically requires temperatures not encountered until the drying section of a paper machine (U.S. Patent Application 2005/0161182 A1). U.S. Patent Application 2005/0287385 discloses styrene-butadiene latex coating composition that provides enhanced compression strength when applied to already formed, substantially dry paper. When the surface applied starch is anionic, combination with highly cationic, dry strength agents, for example polyvinylamine, a precipitate or gel may form.

BRIEF DESCRIPTION OF THE INVENTION

The present invention relates to a stable dry strength composition and its application to an already formed paper substrate. Specifically the composition is comprised of component a) a cationic polymer prepared from either one or multiple compatible monomers; component b) precooked starch, either native or derivatized; and optionally component c) a viscosity modifying agent. Component a) is combinated with component b) and applied to already formed paper to improve the surface dry strength of the already formed paper. Component a) can be prepared from 7-100 molar percent cationic monomer, preferably 10 to 80% and more preferably 20 to 65%, the bulk of the remaining molar percent being non-ionic. Small amounts of crosslinker can also be used to prepare component a). The mixture of component a), component b), and optionally component c) can be applied through any method of chemical treatment to already formed paper including metered size press, puddle size press, spray, roll coater, blade coater, and air knife coater. Without wishing to be bond by theory, it is proposed that cationic functionality from polymer can hydrogen bond with paper fiber and starch molecules resulting in improved starch performance. This invention allows for the composition to be applied at the dry end of the paper machine, providing all the attendant advantages to the papermaker.

DETAILED DESCRIPTION OF THE INVENTION

The present invention provides compositions, that when applied to a formed paper substrate; enhance the dry strength of the paper. The composition comprises component a) a homopolymer or a copolymer prepared from one or more cationic monomers and an acrylamide type neutral monomer, wherein a) is prepared from at least 0.01 to 100 mol percent of cationic monomer, preferably 4 to 100 mole percent of cationic monomer, preferably 7 to 100 mol percent of cationic monomer, preferably 7 to 60 mol percent of cationic monomer, and more preferably 15 to 50 mol percent cationic monomer, the bulk of the remaining molar percent being neutral acrylamide or acrylate type monomers. Small amounts of crosslinkers or other monomers can be used in component a). Specifically, the composition contains component a) a cationic polymer prepared from one or multiple compatible terminal olefin monomers, component b) starch, either native or derivatized, and optionally, component c) a viscosity modifying chemical.

The preparation of acrylamide based homopolymers and copolymers with functional vinyl monomers are well known to those skilled in the art and are well discussed in various journal articles, patents, and books. Radical polymerization of acrylamide by a method using initiating system that generates free radicals is well known and documented. Two classes of commonly utilized radical polymerization initiators are preferred for use in preparing the disclosed composition; thermal, homolytic dissociation and reduction-oxidation initiators. The former category includes azo or peroxide containing initiators, for example 2,2'-azobis(2-methylpropionamidine)dihydrochloride, 2,2'-azobis(2-methylpropionitrile), benzoyl peroxide, tert-butyl hydroperoxide and tert-butyl peroxide. The latter category includes combinations of oxidants (persulfate salts, and peroxides, percarbonate salts) with an appropriate reductant, such as ferrous or sulfite salts. One method of obtaining acrylamide containing polymers and copolymers of molecular weight and polydispersity suitable for use in this invention is disclosed in U.S. Pat. No. 6,939,443.

Suitable cationic polymers for component a) encompass a range of molecular weights from 10,000 to about 1,000,000 Daltons, preferably 50,000 to about 600,000 Daltons, more preferably in the range of from 100,000 to about 250,000 Daltons.

Preferred monomers for component a) with terminal olefin functionality include, but are not limited to, dimethylaminoethyl(meth)acrylate, diethylaminoethyl(meth)acrylate, dimethylaminopropyl(meth)acrylate, diethylaminopropyl(meth)acrylate, N,N-dimethylamino propyl(meth)acrylamide, acrylamidopropyltrimethylammonium chloride, trimethylammonium propyl methacrylamide chloride, dialkylallylamine, diallylamine, and allylamine.

Preferred comonomers for component a) include, but are not limited to, acrylamide, methacrylamide, N-methyl(meth)acrylamide, N-ethyl(meth)acrylamide, N,N-dimethyl(meth)acrylamide, N-isopropyl(meth)-acrylamide, acrylic acid, methacrylic acid, vinyl benzoic acid, vinyl sulfonic acid, 2-Acrylamido-2-methylpropane sulfonic acid.

Cross linked structure may be introduced into component a), by the incorporation of monomers, preferably from the group including ethylene glycol di(meth)acrylate, diethyleneglycol di(meth)acrylate, methylenebisacrylamide, methylene-bis-(meth)acrylamide, ethylene-bis-(meth)acrylamide, hexamethylene-bis-(meth)acrylamide and divinylbenzene.

Component a) polymer comprise 0.01 to 100 mol percent of cationic monomer, preferably 4 to 100 mole percent of cationic monomer, preferably 7 to 100 mol percent of cationic monomer, preferably 7 to 60 mol percent of cationic monomer, and more preferably 15 to 50 mol percent cationic monomer.

In a preferred embodiment, component a) contains at least 7 and up to 100 molar percent cationic monomer, 0-1 molar percent cross linking monomer, and the balance from one of the aforementioned neutral acrylamide or acrylate type monomers.

Any of a variety of starches, from readily available plant sources including, but not limited to maize, rice, potato, wheat, and tapioca, may be employed for component b) of the invention. The starches may be modified in any manner commonly employed including oxidation, glucanohydrolase degradation, and cationization. The preferred starch type for this invention is oxidized tapioca starch.

Component c) may be chosen amongst the classes of compounds that stabilize polymer solutions and reduce viscosity build up. Useful materials are anionic, cationic, or neutral surfactants such as fatty acids, oxyethylated alkylphenols, alkyl amine oxides, alkyl sulfosuccinates, lignosulfonate, alkyl sulfates and salts.

The component a) and component c) are preferably added to a precooked starch slurry or alternatively added before gelatinization process.

A process for making paper with improved dry strength is contemplated by this invention. The process comprises applying to already formed paper the composition of the invention. The composition comprises component a) cationic polymer, component b), starch, and optionally component c.

The composition is generally applied at the dry end of a papermaking machine.

This invention can be applied to any of the various grades of paper that benefit from enhanced dry strength including bag, boxboard, copy paper, container board, corrugating medium, file folder, newsprint, paper board, packaging board, printing and writing, and publication. These paper grades can be comprised of any typical pulp fibers including groundwood, Kraft, sulfate, mechanical, and recycled. The invention can be applied through any method of chemical treatment to already formed paper including metered size press, puddle size press, spray, roll coater, blade coater, and air knife coater. The temperature at the point of application for invention is room temperature to 80° C., preferably 40° C. to 70° C., and more preferably 50° C. to 65° C.

In a preferred embodiment of the present invention, the amount of each of the employed components a) to component c) should be determined by fully considering performance and solution stability of the resulting paper coating composition.

Essential to the function of this invention is its solution stability, referring to the absence of precipitates, coagulates, or gels which can lead to deposition on the paper machine during the course of use. Also the coating composition requires a viscosity such that it can be pumped onto the paper machine and spread over the substrate surface. The preferred viscosity of the composition, under conditions of use, is less than 1000 cPs, preferably less than 800 cPs, preferably between 10 and 500 cPs, and more preferably between 10 and 200 cPs. The viscosity of the composition, at the point of application, at temperature 60° C. or less than 60° C., is 5 to 1000 cPs, preferably between 10 to 800 cPs, preferably between 10 to 600 cPs, and more preferably between 10-100 cPs. Preferably the viscosity is less than 1000 cPs at 60° C., preferably less than 800 cPs at 60° C., preferably less than 500 cPs at 60° C.

The ratio of components a) and component b) may be 1:105 to 1:0.5, preferably 1:52 to 1:1, and more preferably 1:20 to 1:5. If necessary, optional component c) may be added, the ratio of component b) and component c) may be 1:1 to 1:0.01, preferably 1:0.5 to 1:0.05, and more preferably 1:0.3 to 1:0.07.

Alternatively, to boost the performance of component a) an additional amount of highly cationic polymer polyvinylamine, polyallylamine or their functionalized products may be added. In this case the two polymers, component a) and the cationic polymer bearing pendant primary amine functionality, are thoroughly mixed together prior to addition to component b), the cooked diluted starch solution. In order to accommodate the paper making system, the paper coating composition can have its pH adjusted. This may be affected with any of the following non limiting, compounds: hydrochloric acid, sulfuric acid, acetic acid, citric acid, ammonium hydroxide, sodium bicarbonate, sodium hydroxide or potassium hydroxide.

The inventive composition is applied to the already formed paper in an amount of from 0.5 $g/m^2$ to about 20 $g/m^2$, preferably from 1 to 10 $g/m^2$ and more preferably from 2 to 5 $g/m^2$.

The following examples further explain the invention and demonstrate that addition of above described composition offer significant dry strength improvement when applied to paper substrates. The examples and data presented below better illustrate the benefits of the claimed invention and are not meant to be limiting.

EXPERIMENTAL

General Procedure for Paper Treatment

A solution consisting of cooked (90° C., 40 min) modified tapioca starch and dry strength product was added to the nip between a single butyl rubber roll and a single steel roll pressed together at 40 psi. Sheets of paper were passed through the puddle to providing uniform coating. Sheets with higher basis weights were passed twice through the size press roll to ensure uniform wetting of the sheet and achieve desired starch and additive loading. The test samples were immediately dried between the felt and steel of a rotating drum-type drier under conditions which provided a final sheet moisture content between 4 to 7%. The concentration of starch and dry strength additives were varied to obtain each targeted weight pick up level by the paper. The treated paper samples were then conditioned (70° F., 50% humidity, at least 24 hours) and tested.

Paper Testing

Mullen Burst (Mullen) (TAPPI T-403)

This test was used to measure the bursting strength or puncture resistance of the paper samples. The preconditioned test sample was securely clamped between two metal rings of B. F. Perkins Model C Mullen Tester completely covering the rubber diaphragm. A clutch lever is placed in forward position to apply hydrostatic pressure, expanding a rubber diaphragm until the paper sample bursts. When the test specimen bursts, the lever is moved to reverse position and burst strength is recorded in $lb/in^2$.

Ring Crush Test (RCT) (TAPPI T-822)

This test was used to measure the compression strength of the paper samples. Lorentzen & Wettre Crush Tester is utilized to perform this test. From the treated samples, strips of 152.4 mm×12.7 mm are cut using a die. The strip is slide into the sample holder which keeps the sample in a ring shape. The sample holder is placed on the lower platen. A load, at a constant speed of 12.5 mm/min, is applied until the sample fails and this load is recorded in lbf/6 in. Five replicates each are performed in the cross and machine direction. Final reported value is geometric mean of cross and machine direction value.

Brookfield viscosities are measured at 25° C. unless otherwise stated.

Example 1

A series of copolymers of acrylamide with N,N-dimethylaminopropyl methacrylamide (DMAPMA) or N,N-dimethylaminoethyl methacrylate (DMAEMA) were prepared as described. To a nitrogen purged jacketed resin kettle fitted with a mechanical stirrer, water jacketed condenser, nitrogen inlet, thermocouple and two addition ports, was charged with 330 g of deionized water and 1 wt. % solution of cupric sulfate in deionized water (the amount of cupric sulfate in polymer solution was adjusted to have 30 ppm of copper based on acrylamide), 60 g of 50% acrylamide solution, 73.18 g of N,N-dimethylaminopropyl methacrylamide (DMAPMA) and pH was adjusted to 6 using 30 wt. % hydrochloric acid solution. The solution was degassed with nitrogen for 1 h. With the kettle at 40° C., 25 gm of 2 wt. % ammonium persulfate solution, and 20.9 g 2 wt. % sodium metabisulfite solution were added simultaneously to the kettle over a period of 30 min. [In case of Example 1-3: 2,2'-azobis(2-methylpropionamidine)dihydrochloride (V-50 from Wako Chemicals USA, Inc.), was employed as an initiator]. During the course of addition an exotherm was observed and the temperature was maintained less than 70° C. After complete addition the temperature was raised to 65° C. and maintained for an additional three hours. The polymerization was quenched by cooling the kettle to 25° C. The Brookfield viscosity was 153 cPs (LV unit, spindle #2, 60 rpm, 25° C., used 4 oz jar), reduced specific viscosity (1 wt. % in $NH_4Cl$) was 0.65 dL/g, and molecular weight (GPC) was 114000 Daltons. Other poly(acrylamide-co-DMAPMA) and poly(acrylamide-co-DMAEMA) materials that were synthesized are described in Table 1.

TABLE 1

Synthesis of cationic polyacrylamide and its properties

| Examples | DMAPMA (mol %) | DMAEMA (mol %) | MBA (mol %) | Brookfield viscosity (cPs) | Reduced specific viscosity (dL/g) | % Active | SEC $M_w$ (Daltons) |
|---|---|---|---|---|---|---|---|
| 1-1 | 50 | — | — | 153 | 0.650 | 18.40 | 114000 |
| 1-2 | 50 | — | 0.07 | 273 | 0.828 | 18.10 | 232000 |
| 1-3 | 20 | — | 0.04 | 13877 | 2.656 | 13.30 | — |
| 1-4 | 5 | — | 0.03 | 836 | 0.983 | 18.45 | 13100 |
| 1-5 | — | 50 | — | 322 | 0.786 | 18.42 | 140000 |
| 1-6 | — | 50 | 0.05 | 1145 | 1.49 | 18.48 | 342000 |

Example 2

U.S. Pat. No. 6,303,723 teaches a procedure for allylamine hydrochloride polymerization with acrylamide whereby an initiator solution is added to a mixture of the two monomers. However, considering the big difference between the reactivity ratios of acrylamide and allylamine hydrochloride, it is difficult to achieve quantitative conversion of allylamine hydrochloride during its copolymerization with acrylamide. This results in low incorporation of allylamine hydrochloride into the polymer and excess residual monomer that needs to be removed. The method described below allows effective copolymerization of acrylamide with allylamine hydrochloride to achieve near quantitative conversion with controlled polymer properties.

To a nitrogen purged four neck 1 liter round bottom flask fitted with a mechanical stirrer, water jacketed condenser, nitrogen inlet, thermocouple and two addition ports, was charged with 100 g of deionized water, 6.02 g of allylamine followed by slow addition of 11 g of 37 wt. % hydrochloric acid solution to adjust the pH to 3 and degassed with nitrogen for 1 h. The flask was immersed in a preheated oil bath at 80° C. under continuous nitrogen purge. To the reaction vessel 28.75 g of 5 wt % aqueous solution of V-50 initiator and 60 g of 50% acrylamide solution were added simultaneously through different ports over a period of 6 hours. During the course of addition the temperature was maintained at 80° C., and reaction was held for 15 h following the charge. The polymerization was quenched by cooling the flask to 25° C. The Brookfield viscosity was 489 cPs (LV unit, spindle #2, 60 rpm, 25° C., used 4 oz jar), reduced specific viscosity (1 wt. % in $NH_4Cl$) was 0.28 dL/g. Polyacrylamide-co-allylamine) materials that were synthesized are described in Table 2

TABLE 2

Copolymerization of acrylamide with allylamine and its properties

| Examples | MBA (mol %) | Brookfield viscosity (cPs) | Reduced specific viscosity (dL/g) | % Active | SEC $M_w$ (Daltons) |
|---|---|---|---|---|---|
| 2-1 | — | 489 | 0.28 | 17.51 | 24100 |
| 2-2 | 0.04 | 1264 | 0.70 | 17.18 | 21100 |

Example 3

A copolymer of acrylamide with N-vinylformamide was prepared by the process described below. A nitrogen purged jacketed resin kettle fitted with vacuum port, mechanical stirrer, nitrogen inlet, thermocouple, addition ports was charged with 523.6 g of deionized water, 1.78 g of 75 wt. % phosphoric acid and 2.61 g of 25 wt. % aqueous sodium hydroxide solution resulting in solution pH of 6.5. The kettle was heated to 80° C. with stirring. The pressure in kettle was slowly lowered to 320 torr. An acrylamide (50 wt % solution) and N-vinylformamide stock solution with molar ratio of 80:20 mol % was prepared and adjusted to pH 6.5 with caustic. 297.2 g of above mentioned stock solution was added over 90 minutes. With a simultaneous starting charge time, 40.44 gm of 6 wt % V-50 was added over a period of 170 min.

The polymerization temperature (78-79.5° C.) and the vacuum (320 torr) were maintained during the addition. After the V-50 charge was completed, the vacuum was decreased to about 350 torr, and the reaction was continued for an additional 260 min. The vacuum was released to remove an aliquot, designated as 3-1. To the bulk of the reaction 8.76 g of 20% sodium bisulfate solution was added. After 5 min of stirring, 53.5 g of 25 wt. % caustic solution was added over a period of 15 min and reaction was continued for additional 3 h at 80° C. Aliquots after 1 hour (designated 3-2) and 2 hours (designated 3-3) time intervals were withdrawn, followed by cooling to ambient temperature and adjusting to pH 8 with hydrochloric acid. After three hours of hydrolysis, the remaining product (designated 3-4) was quenched by cooling the kettle to 40° C. and adjusting pH to 8. The compositions determined by NMR analysis of the resulting products are set forth in Table 3.

TABLE 3

Copolymerization of acrylamide with N-vinylformamide and properties of its subsequent hydrolyzed product

| Examples | Brookfield viscosity (cPs) | Hydrolysis Time Min | % Mol hydrolyzed (Determined by NMR analysis) | |
|---|---|---|---|---|
| | | | Acrylamide | Formamide |
| 3-1 | 5559 | 0 | 0 | 0 |
| 3-2 | 1722 | 60 | 30 | 50 |
| 3-3 | 1755 | 120 | 34 | 73 |
| 3-4 | 1662 | 180 | 34 | 73 |

Example 4

A mixture of cationic polyacrylamide and polyvinyl amine or modified polyvinylamine (Hercobond® 6000 paper performance additives, available from Ashland Incorporated) was prepared by mixing the two polymer solutions. In a typical experiment, a 4 oz. jar was charged with 100 g of cationic polyacrylamide (PAM) solution as prepared following Example 1 protocol, to this 5 wt % of the Hercobond® 6000 product (total solid basis) was added. The mixture of polymers was shaked over Lab Line® Orbit Environ Shaker for 1 hour at 25° C.

TABLE 4

Blend of cationic polyacrylamide with polyvinylamine

| Examples | PAM Designation | Polyvinylamine |
|---|---|---|
| 4-1 | Example 1-4 | 2.5 wt % Hercobond ® 6350 |
| 4-2 | Example 1-4 | 5.0 wt % Hercobond ® 6350 |

Example 5

Utilizing the above described paper application method; cationic polyacrylamides were evaluated for effect on sheet strength. All runs, except the 5-1, contained 3 wt % ExcelSize 15 in the size press solution. Copolymers containing either diallylamine or dimethylaminopropyl methacrylamide provide improved strength when applied to the surface of recycled linerboard basesheets. The additive concentrations listed below are on dry basis of the paper. (Dry additive over dry weight of paper, "d/d")

TABLE 5

Effect of acrylamide based additives on dry Strength of recycled linerboard. Basesheet made using Chinese old corrugated cardboard, Basis Weight = 100 g/m$^2$, Caliper 7.4 mil, ExcelSize 15 = oxidized Tapioca starch

| Examples | Additive | % Additive (d/d) | Strength data | |
|---|---|---|---|---|
| | | | Mullen (lb/in$^2$) | RCT (lbf/6 in.) |
| 5-1 | No Starch | — | 19.0 | 21.3 |
| 5-2 | Starch Only | — | 24.2 | 29.1 |
| 5-3 | 2-2 | 0.50 | 28.2 | 30.3 |
| 5-4 | 2-2 | 1.00 | 33.0 | 35.5 |
| 5-5 | 1-1 | 0.50 | 26.6 | 28.6 |
| 5-6 | 1-1 | 1.00 | 32.0 | 36.4 |
| 5-7 | 1-3 | 0.30 | 27.6 | 34.7 |

Example 6

Utilizing the above described paper application method, cationic polyacrylamides were evaluated for effect on sheet strength. All runs, except the 6-1, contained 2 wt % ExcelSize C155 in the size press solution. Copolymers containing N,N-dimethylaminoethyl methacrylate demonstrate somewhat less efficient strength improvement compared to copolymers containing either diallylamine or dimethylaminopropyl methacrylamide. In the case of polyacrylamide-co-vinylformamide) efficiency improves as the polymer is more hydrolyzed. The additive concentrations listed below are on dry basis of the paper. (Dry additive over dry weight of paper)

TABLE 6

Effect of acrylamide based additives on dry Strength of recycled linerboard. Basesheet made using American old corrugated cardboard, Basis Weight = 198 g/m$^2$, Caliper = 11.5 mil, ExcelSize C155 = Slightly cationic and oxidized Tapioca starch.

| Examples | Additive | % Additive (d/d) | Strength data | |
|---|---|---|---|---|
| | | | Mullen (lb/in$^2$) | RCT (lbf/6 in.) |
| 6-1 | No Starch | — | 58.1 | 84.4 |
| 6-2 | Starch Only | — | 69.8 | 98.7 |
| 6-3 | 1-1 | 0.5 | 77.6 | 105.8 |
| 6-4 | 1-1 | 1.0 | 81.6 | 115.4 |
| 6-5 | 1-5 | 0.5 | 68.4 | 106.9 |
| 6-6 | 1-5 | 1.0 | 73.4 | 109.2 |
| 6-7 | 1-6 | 0.5 | 74.6 | 107.4 |
| 6-8 | 1-6 | 1.0 | 74.0 | 112.6 |
| 6-9 | 2-1 | 0.5 | 73.6 | 107.1 |
| 6-10 | 2-1 | 1.0 | 80.4 | 108.6 |
| Comparative 6-11 | 3-1 | 0.5 | 66.0 | 98.0 |
| Comparative 6-12 | 3-1 | 1.0 | 72.4 | 106.3 |
| 6-13 | 3-2 | 0.5 | 71.6 | 105.9 |
| 6-14 | 3-2 | 1.0 | 71.1 | 109.4 |
| 6-15 | 3-3 | 0.5 | 73.7 | 105.2 |
| 6-16 | 3-3 | 1.0 | 76.0 | 107.9 |
| 6-17 | 3-4 | 0.5 | 73.4 | 109.6 |
| 6-18 | 3-4 | 1.0 | 77.9 | 109.0 |

Example 7

Utilizing the above described paper application method; a cationic polyacrylamides were evaluated for effect on sheet strength using American old corrugated cardboard, a strong basesheet. All runs, except the 7-1, contained 2 wt % Excel-Size 15 starch in the size press solution. The use of cationic additive showed strength improvement, however overall strength improvement observed is smaller compare to that observed on Chinese old corrugated cardboard. The additive concentrations listed below are on dry basis on the paper.

TABLE 7

Effect of acrylamide based additives on dry strength of recycled linerboard. Basesheet made using American old corrugated cardboard, Basis Weight = 198 g/m², Caliper = 11.5 mil, ExcelSize 15 = oxidized Tapioca starch

| Examples | Additive | % Additive (d/d) | Strength data Mullen (lb/in²) | RCT (lbf/6 in.) |
|---|---|---|---|---|
| 7-1 | No Starch | — | 58.1 | 97.8 |
| 7-2 | Starch Only | — | 76.1 | 123.3 |
| 7-3 | 2-2 | 0.5 | 84.4 | 119.9 |
| 7-4 | 2-2 | 1.0 | 82.4 | 125.4 |
| 7-5 | 1-6 | 1.0 | 76.6 | 126.8 |
| 7-6 | 1-1 | 0.25 | 78.0 | 131.3 |
| 7-7 | 1-1 | 0.5 | 81.8 | 126.6 |

The invention claimed is:

1. A composition for improved dry strength of formed cellulosic substrates comprising a) a cationic polymer prepared from 0.01 to 100 molar percent of either one or multiple cationic monomer, wherein the cationic monomer is selected from the group consisting of N,N-dimethylaminopropyl (meth)acrylamide, allylamine, dimethylaminoethyl(meth)acrylate, diethylaminoethyl(meth)acrylate, diethylaminopropyl(meth)acrylate, acrylamidopropyltrimethylammonium chloride, trimethylammonium propyl methacrylamide chloride, dimethylallylamine, diallylamine, vinylamine, and optionally comonomers selected from the group consisting of acrylamide, methacrylamide, N-methyl(meth)acrylamide, N-ethyl(meth)acrylamide, N,N-dimethyl(meth)acrylamide, N-isopropyl(meth)-acrylamide, and combinations thereof, component b) starch, either native or derivatized, and optionally, component c) a viscosity modifying chemical; wherein the viscosity modifying chemical is selected from fatty acids, oxyethylated alkylphenols, alkyl amine oxides, alkyl sulfosuccinates, lignosulfonate, alkyl sulfates and salts thereof, wherein the composition is a solution free of precipitates, coagulates, and gels; and wherein the Brookfield viscosity of the composition is less than 800 cPs at a temperature of 60° C. using a #2 spindle, and wherein the composition is applied to the surface of the formed cellulosic substrate.

2. The composition of claim 1 wherein the ratio of component a) to component b) is from 1:105 to 1:0.5.

3. The composition of claim 1 wherein the ratio of component b) to component c) is from 1:1 to 1:0.01.

4. The composition of claim 1 wherein component a) cationic polymer comprises 4 to 100 molar percent of cationic monomer.

5. The composition of claim 4 wherein component a) cationic polymer comprises 7 to 100 molar percent of cationic monomer.

6. The composition of claim 5 wherein component a) cationic polymer comprises 15 to 50 molar percent cationic monomer.

7. The composition of claim 1 wherein component a) has a weight average-molecular weight of from 10,000 to about 1,000,000 Daltons.

8. The composition of claim 1 wherein component a) has a weight average molecular weight of 50,000 to about 600,000 Daltons.

9. The composition of claim 1 wherein component a) has a weight average molecular weight of from 100,000 to about 250,000 Daltons.

10. The composition of claim 1 wherein a crosslinking monomer is incorporated into component a), wherein the crosslinking monomer is selected from the group consisting of ethylene glycol di(meth)acrylate, diethyleneglycol di(meth)acrylate, methylenebisacrylamide, methylene-bis-(meth)acrylamide, ethylene-bis-(meth)acrylamide, and hexamethylene-bis-(meth)acrylamide and wherein the crosslinking monomer is incorporated into the polymer at less than 1 molar percent.

11. The composition of claim 1 wherein the component b) is unmodified or modified starch and is selected from the group consisting of corn starch, rice starch, potato starch, wheat starch, tapioca starch and combinations thereof.

12. The composition of claim 1 wherein the viscosity of the composition is less than 500 cPs at a temperature of 60° C.

13. A process for making paper with improved dry strength comprising applying the composition of claim 1 to already formed paper by coating said composition on said already formed paper.

14. The process of claim 13 wherein the composition is applied to the formed paper in an amount of from 0.5 g/m² to about 20 g/m².

15. The process of claim 14 wherein the composition is applied to the formed paper in an amount of from 1 to 10 g/m².

16. The process of claim 15 wherein the composition is applied to the formed paper in an amount of from 2 to 5 g/m².

17. The process of claim 13 wherein the ratio of component a) to component b) is from 1:105 to 1:0.5, wherein the ratio of component b) to component c) is from 1:1 to 1:0.01, wherein component a) cationic polymer comprises 4 to 100 molar percent of cationic monomer, and wherein component a) is prepared from one or more cationic monomers wherein at least one cationic monomer is selected from the group consisting of N,N-dimethylamino propyl(meth)acrylamide, allylamine, dimethylaminoethyl(meth)acrylate, diethylaminoethyl(meth)acrylate, diethylaminopropyl(meth)acrylate, acrylamidopropyltrimethyl ammonium chloride, trimethylammonium propyl methacrylamide chloride, dimethylallylamine, vinylamine, and optionally comonomers selected from the group consisting of acrylamide, methacrylamide, N-methyl(meth)acrylamide, N-ethyl(meth)acrylamide, N,N-dimethyl(meth)acrylamide, N-isopropyl(meth)-acrylamide, and combinations thereof.

18. The process according to claim 17, wherein component a) polymer further comprise comonomers selected from the group consisting of acrylic acid, methacrylic acid, vinyl benzoic acid, vinyl sulfonic acid, 2-acrylamido-2-methylpropane sulfonic acid and combinations thereof.

19. The composition according to claim 1, wherein component a) polymer further comprise comonomers selected from the group consisting of acrylic acid, methacrylic acid, vinyl benzoic acid, vinyl sulfonic acid, 2-acrylamido-2-methylpropane sulfonic acid and combinations thereof.

20. The composition of claim 1, wherein the composition is applied to the surface of the formed paper in an amount of from 1 to 10 g/m².

21. The composition of claim 20, wherein the composition is applied to the surface of the formed paper in an amount of from 2 to 5 g/m².

* * * * *